United States Patent [19]

Hollingsworth

[11] 3,862,346

[45] Jan. 21, 1975

[54] THIN FILM DEFLUORINATION OF PHOSPHATE ROCK

[75] Inventor: Clinton Allen Hollingsworth, Lakeland, Fla.

[73] Assignee: Borden, Inc., Columbus, Ohio

[22] Filed: Mar. 21, 1974

[21] Appl. No.: 453,296

Related U.S. Application Data

[63] Continuation-in-part of Ser. No. 179,523, Sept. 10, 1971, , which is a continuation-in-part of Ser. No. 757,413, Sept. 4, 1968, Pat. No. 3,617,242.

[52] U.S. Cl............. 426/381, 71/44;64 DA, 426/74
[51] Int. Cl............................................. C05b 13/00
[58] Field of Search ................... 71/44–47, 64 DA; 426/381, 74

[56] References Cited
UNITED STATES PATENTS

| | | | |
|---|---|---|---|
| 2,143,865 | 1/1939 | Coxson | 71/44 X |
| 2,499,767 | 3/1950 | Maust | 71/44 |
| 2,997,367 | 8/1961 | Williams | 71/44 X |
| 3,364,008 | 1/1968 | Hollingsworth | 71/41 |
| 3,376,124 | 4/1968 | Hollingsworth | 71/41 X |

*Primary Examiner*—Samih N. Zaharna
*Assistant Examiner*—Richard Barnes
*Attorney, Agent, or Firm*—George P. Maskas; George A. Kap

[57] ABSTRACT

Defluorination of phosphate rock is carried out by introducing seed particles into a fluid bed reactor and a fluidizing gas to establish a fluidized bed therein; gradually introducing phosphate rock feed liner than about 35 mesh at a point below the top of the fluid bed; continue introducing the phosphate rock feed to establish a fluidized bed containing seed particles at least some of which are coated with a thin film of the phosphate rock feed; maintaining the fluidized bed at a sufficient temperature to defluorinate the phosphate rock feed; removing defluorinated phosphate rock product from the reactor; and recycling at least a portion of the fine product particles to the reactor to provide a certain amount of seed particles for defluorination.

17 Claims, No Drawings

THIN FILM DEFLUORINATION OF PHOSPHATE ROCK

This application is a continuation-in-part of application Ser. No. 179,523 filed on Sept. 10, 1971, which in turn is a continuation-in-part of application Ser. No. 757,413 filed on Sept. 4, 1968, which has matured into U.S. Pat. No. 3,617,242 on Nov. 2, 1971.

This invention relates to defluorination in a fluid bed reactor of particulate phosphate rock by means of thin-film technique whereby the use of conventional defluorinating reagents can be partially or completely eliminated or alternatively, in an embodiment where the defluorinating reagents are used, the thin-film technique for defluorinating phosphate rock can be used to advantage to carry out the defluorination process at temperatures which are 100° to 300° F below the conventional temperatures.

Heretofore, it has not been practical to commercially defluorinate phosphate rock without substantial reagent additions because production rates have been too low to be economical. For example, when raw phosphate was fed to a 6 ½ ft. diameter by 165 ft. long rotary kiln, the feed rate was about 0.25 tons per hour as compared to about 4 tons per hour using the process covered by the Hollingsworth U.S. Pat. No. 2,995,437 in which about 10% $P_2O_5$ (as phosphoric acid) and about 7% $Na_2O$ (as caustic soda) are added to the phosphate rock.

To aid in the understanding of the present invention, a semantic distinction should be made between the thin-film mechanism of the present invention and of other agglomerative mechanisms. All agglomerative processes provide means whereby small particles come together, whether by fusion, adhesion, or by magnetic or electrostatic attraction, with or without attendant chemical reaction, and are held together so as to assume the properties of, or become larger particles. It is often the case when agglomeration occurs in environments such as fluid bed reactors, that the individual particles will become stuck to one another much like the peanuts in peanut brittle. In the present invention the feed particles are very small compared to the bed particles; when the feed particles attach themselves to bed particles they do so forming a thin layer, which then reacts (defluorinates) in the thermal and chemical environment of the reactor. This mechanism is what is meant by the term "thin-film."

Thin-film defluorination was attempted on a laboratory scale more than 25 years ago by covering the bottom of a combustion boat with a thin film of phosphate rock powder. The boat was thrust into a furnace for several seconds and withdrawn during which time, the phosphate rock powder was sufficiently defluorinated. When a boat was filled with phosphate rock powder to a thickness of up to ⅛ inch or ¼ inch, the time it took to defluorinate the powder was much longer —on the order of 15 to 30 minutes. Because of the time and cumbersome operation, this defluorination procedure was not further investigated because it did not present any attractive features for a commercial operation.

Defluorination of phosphate rock powder passing through 100 mesh or finer was also attempted in the past in a kiln. The powder was introduced into a rotating inclined kiln at one end and moved downwardly while combustion gases containing water vapor passed countercurrently through to remove fluorine. This approach did not prove effective because the powder balled up into large chunks as it moved downwardly in the kiln thus hindering defluorination. In fact, it was found that unground concentrate, which generally has a particle size from −14 mesh to +150 mesh (−100 mesh less than 10 percent) defluorinated much more effectively than did pulverized phosphate rock (mostly −100 mesh) and with less balling up. In view of these discouraging results, pulverized phosphate rock has been generally regarded with disfavor as a defluorination feed for rotary kilns.

As fluid bed reactors became a more accepted means of practicing the art of defluorination the practice still favored the use of a relatively coarse feed. This is probably due to the fact that the operator of a fluid bed reactor must strive to control entrainment losses, and thus would be reluctant to put pulverized material into a reactor.

Phosphate-containing materials are in great demand for use both as plant fertilizers and as animal feed supplements, and the market for such materials is constantly growing. The principal sources of phosphate are the great natural deposits of phosphate rock found in Florida and in the western states, and such widely distributed phosphatic materials as apatite. Unfortunately, these naturally occurring phosphate materials contain combined fluorine in quantities which can, under certain conditions, interfere with the availability of the phosphate values when used as fertilizers and which are detrimental to health when used as animal feed supplements. As a result, when these phosphatic materials are to be used as fertilizers, and particularly when they are to be used as animal feed supplements, the phosphatic material is commonly treated to reduce the fluorine content below a specified maximum amount, which is specified by the Association of American Feed Control Officials, Inc. and which may change from time to time. This amount is usually stated as a weight ratio of phosphorus to fluorine. At one time this ratio was 40:1 but currently it is 100:1. Higher fluorine levels are sometimes encountered in phosphatic animal feed supplements, but these cannot be sold as defluorinated phosphate, under current feed control regulations.

A great deal of effort has been devoted to the problem of developing economical and efficient processes for reducing the fluorine content of these phosphatic materials to acceptable levels. Thermal processes have been the most widely known and commercially successful means of defluorinating phosphate rock. A typical thermal process involves heating the phosphate rock in the presence of phosphoric acid, water vapor and other reagents, such as soda compounds, at a temperature in excess of about 2,200° F to drive off a substantial portion of the fluorine content of the rock and therby obtain a defluorinated phosphate product. One difficulty encountered in the practice of this art is the loss of feed material from the kiln. Fine particles are readily swept out of a kiln, and, even if an attempt is made to recover them by means of cyclone dust collectors or other suitable means, a certain amount will be lost. By forming the phosphate rock and other ingredients into nodules of size and strength sufficient to resist such entrainment, this difficulty can largely be overcome.

Another difficulty which arises when the defluorination of phosphate rock is attempted is that the temperature required for the removal of the fluorine is so high that objectionable fusion of the rock can take place before removal of fluorine to the desired extent is accomplished. This difficulty is met by adding reagents, the function of which is to reduce the temperature at which defluorination will occur, without unduly depressing the fusion temperature. The combining of these reagents to satisfy the chemical requirements of the process is often accomplished in connection with agglomeration or nodulizing to satisfy the physical requirements of the process. A great deal of time and effort have been expended in developing methods for making such a nodulized feed material.

In order to illustrate a mode of preparing feed, as in U.S. Pat. No. 3,189,433 to Hollingsworth et al, phosphate rock is mixed with 7 to 13% $P_2O_5$ (added as phosphoric acid) after which 5 to 9% of a sodium compound (calculated as $Na_2O$) is added and the mix is then formed into agglomerates for subsequent feeding to a rotary kiln or fluid bed reactor to heat-treat for the removal of fluorine. The feed can also be prepared as in U.S. Pat. No. 3,364,008 to Hollingsworth, et al, in which phosphate rock having a particle size of less than 10 mesh is mixed with defluorinating reagents to effect at least a partial reaction while maintaining the temperature of the reaction mixture below about 500° F. The partially reacted, unagglomerated feed is then introduced into a fluid bed reactor maintained at 2,200° to 2,700° F where the reaction between the fluorine-containing phosphate rock and the defluorinating reagents is substantially completed as fluorine is evolved.

Defluorinating reagents used include silica, soda, acids, calcium and potassium compounds. Suitable acids are phosphoric, sulfuric, hydrochloric, fluosilicic and nitric. Phosphoric acid is preferred since it improves grade of the product. These reagents should be held to a minimum as they are expensive and greatly increase raw material costs.

The thin film technique applies to any non-fusion method of defluorinating phosphate rock. Whenever reagents are used in conventional defluorination processes, the mole ratio $$CaO + Na_2O - 3\ P_2O_5/SiO_2$$

should be controlled by proportioning and selection of ingredients so as to produce an acceptable product and to avoid operating difficulties such as fusion and failure to defluorinate. This ratio and its use are described in detail in U.S. Pat. Nos. 2,995,437 and 2,839,377.

It is possible to practice the process of the present invention outside the limits of the aforementioned patents for the purpose of conservation of reagents. When the process of the present invention is practiced with a minimum of reagent addition, the mole ratio is preferably adjusted to a value around 2, i.e., from about 1.5 to about 2.2 and preferably 1.7 to 2.1. If, for example, a certain phosphate rock has a mole ratio exceeding the upper limit of this preferred range, then addition of $P_2O_5$ or silica would be indicated; if the mole ratio of the rock alone is too low, one would add $Na_2O$ or CaO. Blending with other raw phosphate rocks so as to produce a mixture having a mole ratio in the desired range, or selecting an entirely different rock, are also means of controlling the mole ratio, as is well known in the art.

An advantage of the process described herein resides in the fact that with the use of thin-film defluorination technique in presence of the conventional defluorinating reagents, defluorination can be effected at substantially lower temperatures than the temperatures generally used in the past. Reduction of operating temperature has the desired effect of reducing operating problems as well as fuel cost.

With the thin-film defluorination technique, one can obtain higher production rates of defluorinated phosphate rock since it is easier for fluorine to escape from a finer particle than a coarser particle. This rationale is based on the assumption that defluorination is essentially a surface reaction and fluorine must be at the surface to be removed.

Another important advantage that is ascribed to the novel technique of defluorinating phosphate rock is the lower production costs. Presently, a ton of defluorinated phosphate rock sells for $72 of which, raw material cost is $42, based on quoted prices in Chemical Marketing Reporter of Feb. 11, 1974, and 95% recovery. Defluorinating reagents cost $27.90 per ton, of which about $7.40 is for 7 percent added sodium oxide as caustic soda and $20.50 for 10 percent added $P_2O_5$ as 54 percent phosphoric acid. It is evident from these figures that the cost of defluorinated rock can be reduced significantly when the defluorination reagents are reduced or eliminated entirely. The following table shows the cost composition:

| Phosphate rock/ton product | $13.98 | 33.4% |
|---|---|---|
| NaOH | 7.37 | 17.6% |
| $H_3PO_4$ | 20.53 | 49.0% |
| | $41.88 | 100.0% |

In the highly competitive fertilizer and animal feed industries, such savings are of very significant advantage. Optimum operating conditions may dictate the use of small amounts of the defluorinating reagents, in which case, the reduced savings in the cost of reagents would be off-set by such factors as increased production rate and lower operating temperatures which would reduce operating problems with respect to the reactor and thus increase its useful life.

In carrying out the process of this invention, a fluidized bed of coarser seed particles is established in a reactor provided with a perforated grid and then pulverized feed is injected. The seed particles are preferably defluorinated rock particles but can be of any inert material. The feed contains from approximately 2 to 4 percent fluorine. The size of the seed particles is generally in the range of −¼ inch to + 35 mesh, Tyler Standard, whereas pulverized feed is finer than about 35 mesh, and preferably finer than about 100 mesh. For start-up, amount of the coarser seed particles in the fluid bed should be enough to give a bed which extends at least over the feed injection point. In the preferred embodiment, amount of the seed particles should be enough to have the bed at the level of normal operation. Generally speaking, bulk density of the phosphate rock feed is 60 to 110 lbs/ft³. The space rate of the fluidizing gases through the reactor should not be so great as to entrain the bed particles in the exhaust gases and not so low as to permit the bed to lose fluidity. On the basis of empirical data, the space rate should be in the range of 4 to 10 ft/sec., and preferably from 5 to 8 ft/sec.

For defluorination to proceed by thin-film defluorination, feed particle size fractions of less than 100 mesh are preferred. As the phosphate rock feed particles are injected into a fluid bed reactor at a point below the top of the fluid bed, they adhere to the larger seed particles causing the seed particles to accrete. As the feed particles adhere to the seed particles, a thin film of the feed particles is formed on the seed particles which is easily purged of fluorine with the aid of the thermal environment which contains water vapor. As feed particles adhering to the seed particles are defluorinated, additional particles adhere to the defluorinated particles in the fluid bed reactor thus increasing the size of the fluidized particles. In this manner, rapid and continuous defluorination of the phosphate feed is accomplished. It should be evident that with feed particles of a larger size, additional time or higher temperature is required for the fluorine to escape from the interior thereof.

The feed can be raw phosphate rock of above-specified size without any defluorinating reagents, or it can be phosphate rock with the usual amounts of the defluorinating reagents. The defluorinating reagents can be separately added to the fluid bed reactor, as described in the Hollingsworth U.S. Pat. No. 3,617,242, or they can be combined with raw phosphate rock, dried and pulverized prior to being added to the reactor, as is known by those skilled in the art.

Pulverized feed may be injected into the fluidized bed through a feed pipe located in the side of the reactor or in the grid. For reactors larger than about 6 ft. in diameter two or more injection points should be used. The product can be removed from the reactor by the use of an overflow pipe or by an underflow pipe.

In commercial fluid bed reactors which have internal diameters of 8 to 50 feet where the depth of the fluid bed is greater than 2 feet and preferably 4 to 10 feet, operating temperatures ordinarily vary from about 2,450° to 2,700° F. It was discovered that phosphate rock can be defluorinated to meet the same specifications at temperatures 100° to 300° F lower than those ordinarily used when thin-film technique is utilized. This means that with the process described herein, phosphate rock can be defluorinated at a temperature generally in the range of 2,250° to 2,450° F, and preferably from 2,300° to 2,400° F when normal amounts of defluorinating reagents are used, as described in U.S. Pat. No. 2,995,437 to Hollingsworth. In the case when defluorinating reagents are omitted or reduced, defluorination of phosphate rock pursuant to thin-film technique will be accomplished at 2,450° to 2,700° F, preferably 2,500° to 2,650° F.

Defluorinated product recovered from the reactor is screened and at least a portion of the fines passing through 10 mesh screen may be recycled to the reactor. The recycled fines play an important role in the process in that they function as seed particles which accrete as the phosphate rock feed particles accumulate on the surfaces thereof and evolve fluorine, as described above.

During normal operation, recycling of the finer fractions of the product may be required if there is insufficient self-agglomeration of the feed particles. For effective fluidization, the bed should consist of a wide range of particle sizes, preferably at least 25 percent being −14 mesh. when distribution of particle size becomes too narrow, it is necessary to add fine recycle preferably of −14 mesh, since otherwise, fluidity of the bed would be jeopardized. For example, if the screen analysis of a bed sample indicates that 5 percent of the particles in the bed is of −14 mesh, 50 percent of −10 mesh and 95 percent of −8 mesh, addition of fine recycle must be made. An example in which recycle of fines is not required is a bed sample in which 6 percent is −28 mesh, 15 percent is −20 mesh, 34 percent is −14 mesh, 54 percent is −10 mesh, 75 percent is −8 mesh and 89 percent is −6 mesh.

Thin-film defluorination process is characterized by certain essential features which are prerequisite to effective operation. The essential features include particle size, fluid bed reaction, presence of seed particles at least to initiate the process, introduction of the feed below the top level of the fluid bed. Also important is the step of recycling at least a part of the finer product particles to maintain fluidity of the bed.

A fluid bed reactor which is particularly suitable for use in defluorinating phosphate rock by the thin-film technique is the subject of patent application Ser. No. 179,494 entitled "Grid Burner System" wherein the inventors are Hollingsworth and Snyder. That application was filed on Sept. 10, 1971. The reactor described in said application utilizes a novel grid which includes mixing chambers from 1 to 6 inches in width and a length of at least 3 inches, and preferably from 6 to 18 inches. In the preferred embodiment, the mixing chambers are cylindrical and have a diameter in the range of 1.5 to 3 inches. Total open area per square foot of the grid is from 3 to 14 in$^2$, and preferably from 6 to 10 in$^2$. The mixing chambers are filled with packing, preferably spheres, varying in size from 1/2 to 2.5 inches along its largest dimension. In order to withstand high temperatures encountered in defluorination of phosphate rock, which may reach as high as about 3,000° F when hot spots develop, the packing must be made from a suitable refractory material such as 99 percent Alumina.

The size of the mixing chambers is such as to prevent efficient burning therein. Air and fuel, such as natural gas, are introduced into the mixing chambers where they mix and issue therefrom as a combustible mixture. The outstanding feature of that reactor is that burning of the fuel-air mixture occurs within the fluidized bed substantially at the level of the grid, i.e., not within the mixing chambers nor above the fluidized bed.

The thin-film technique of defluorinating particulate phosphate rock is illustrated with several examples which follow.

EXAMPLE I

The reactor used here was 23 feet 8 inches high, measured from top of the grid to the roof thereof, and had an internal diameter in bed area of 45 inches. The grid was 9 ½ inches thick and was provided with 28 mixing chambers 2 inches in diameter. Natural gas was delivered to the mixing chambers by means of conduits passing through a plenum chamber disposed below the grid. Air was introduced into the plenum chamber and mixed with the natural gas through 28 air-inlet openings 7/64 inches in diameter provided in each conduit. The mixing chambers were filled with 1 inch diameter balls composed of 99 percent Alumina.

In this example, the test consisted of two parts, the first lasting 9 hours while the second 3 hours. The feed was prepared by introducing 92.4 parts by weight of unground North Carolina phosphate into the reactor together with 7.6 parts of $P_2O_5$ added as phosphoric acid. Most of the added $P_2O_5$ was to neutralize the excess lime in phosphate. This rock was sintered at 1,900°–2,100° F and then pulverized to 90 percent −48 mesh. The resulting feed was fed to the reactor at the rate of 371 lbs/hr for the first part of the test and at 865 lbs/hr for the second part. Respective bed temperatures were 2,650° F and 2,600° F and the space rate was the same for the duration of the test — 7.6 ft/sec, including feed injection air and fluidizing mixture.

The results were excellent — the product analyzed 0.02 percent fluorine and 17.86 percent in the first part and 0.08 percent fluorine and 18.04percent in the second part.

EXAMPLE II

The fluid bed reactor described in Example I was used to defluorinate pulverized Florida concentrate having a particle size passing through 150 mesh. The feed consisted of 91.2 parts by weight of the concentrate, 5.5 parts $P_2O_5$ added as phosphoric acid, and 3.3 parts limestone. The feed rate was 697 lbs/hr of which 41 lbs/hr was −14 mesh recycle. With an average bed temperature of 2,555° F and a space rate of 7.6 ft/sec, fluorine content of the product was 0.19 percent. Duration of the run was 5 hours, after stabilization of operating conditions.

EXAMPLE III

The feed consisted of 83 percent phosphate rock, 10 percent $P_2O_5$ added as phosphoric acid and 7 percent $Na_2O$ added as sodium hydroxide. The feed was prepared in a feed preparation plant following which it was pulverized. The pulverized feed, prepared for defluorination in the reactor described in Example I, had the following sieve analysis:

| | |
|---|---|
| 4% | +48 mesh (Tyler Standard) |
| 30% | −48 +65 mesh |
| 32% | −65 +100 mesh |
| 10% | −100 +150 mesh |
| 24% | −150 mesh |

The space rate was 6.9 ft/sec and the feed was introduced into the reactor at 891 lbs/hr, which included 41 lbs/hr of −14 mesh recycle. The fluid bed temperature average 2,390° F and duration of the run was 5 hours after stabilization of operating conditions.

The product analyzed 0.09 percent fluorine and 18.2 percent phosphorus. Its sieve analysis was as follows:

| | |
|---|---|
| 51% | +10 mesh (Tyler Standard) |
| 25% | −10 +14 mesh |
| 15% | −14 +20 mesh |
| 6% | −20 +28 mesh |
| 3% | −28 mesh |

EXAMPLE IV

Unpulverized feed from the feed preparation plant, described in Example III, was defluorinated in the fluid bed reactor, described in Example I. The feed rate was 998 lbs/hr and the space rate was 6.9 ft/sec. Average bed temperature was 2,540° F.

The product contained 0.12 percent fluorine and 18.3 percent phosphorus. Its screen analysis was as follows:

| | |
|---|---|
| 5% | +10 mesh (Tyler Standard) |
| 9% | −1 +14 mesh |
| 18% | −14 +20 mesh |
| 25% | −20 +28 mesh |
| 19% | −28 +35 mesh |
| 11% | −35 +48 mesh |
| 13% | −48 mesh |

As has been empirically demonstrated, thin-film technique can be used to advantage to defluorinate a charge comprising substantially all phosphate rock at ordinary or lower defluorinating temperatures. In view of the fact that in the past, a charge contained about 80 to 85 percent phosphate rock and 15 to 20 percent of defluorinating reagents, the term "substantially all phosphate rock" as used herein, is defined as including at least 90 percent, and preferably at least 95 percent, phosphate rock.

EXAMPLE V

The fluid bed reactor described in Example I was used to defluorinate pulverized Florida concentrate having a particle size passing through 150 mesh. The feed consisted of 97.7 parts by weight of the phosphate and 2.3 parts or reactive silica. The feed rate was 682 lbs/hr of which 68 lbs/hr was −10 +35 mesh recycle. With an average bed temperature of 2,595° F and a space rate of 6.7 ft/sec, 88 percent of the fluorine was removed. Duration of the run was 5 hours after stabilization of operating conditions. Following are analyses of phosphate rock and product.

| | P | CaO | $SiO_2$ | F | % of Total P Soluble in 2% Citric Acid |
|---|---|---|---|---|---|
| Phosphate | 15.0 | 48.98 | 3.05 | 3.90 | — |
| Product | 17.2 | 50.30 | 4.67 | 0.45 | 80.3 |

EXAMPLE VI

The fluid bed reactor described in Example I was used to defluorinate pulverized Florida concentrate having a particle size passing through 150 mesh. The feed consisted of 96.9 percent phosphate and 3.1 percent diatomaceous earth (about 85 percent $SiO_2$). The feed rate was 687 lbs/hr of which 68 lbs/hr was −10 +35 mesh recycle. With an average bed temperature of 2,597° F and a space rate of 6.7 ft/sec, fluorine content of the product was 0.7 percent and phosphorus was 16.7 percent. 79 percent of the fluorine was removed.

Products shown in Examples V and VI are known as low fluorine phosphate as more than 75 percent of the fluorine was removed. Although these products cannot be sold as defluorinated phosphate, they are marketable as low fluorine phosphates. The thin-film technique is particularly good for producing these low fluorine phosphates without the use of expensive defluorinating reagents.

EXAMPLE VII

The fluid bed reactor described in Example I was used to defluorinate raw pulverized Florida concentrate having a particle size passing through 100 mesh. Raw phosphate rock analyzed 34.13 percent $P_2O_5$, 47.27 percent CaO, 4.82 percent $SiO_2$, and 0.77 percent $Na_2O$. The mol ratio for this phosphate by the formula

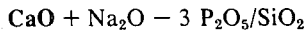

was 1.67. The raw pulverized phosphate rock (no reagents added) was fed to the fluid bed reactor at a rate of 250 lbs/hr including 50 lbs per hour of −10 mesh (mostly −14 mesh) recycle. Bed depth was about 5 feet and feed was injected through the side of the reactor at a point 2 ½ feet above the grid. The bed temperature was maintained at about 2,550° F. The product analyzed 0.07 percent fluorine.

What is claimed is:

1. Process for defluorinating phosphate rock feed by thin-film technique comprising initially introducing to a fluid bed reactor seed particles of −¼ inch to +35 mesh (Tyler Standard); introducing fluidizing gases into the reactor to establish a fluidized bed of the seed particles; gradually introducing the phosphate rock feed finer than about 35 mesh at a point below the top of the fluidized bed until operating conditions are stabilized; continue introducing into the fluid bed reactor phosphate rock feed and the fluidizing gas in order to establish a fluidized bed containing seed particles at least some of which are coated with a thin film of the phosphate rock feed; maintaining the fluidized bed at a sufficient temperature to remove at least 75 percent of the fluorine in the phosphate rock feed; and removing a defluorinated phosphate product from the fluid bed reactor.

2. Process of claim 1 wherein the phosphate rock feed is finer than about 100 mesh, the fluorine content thereof is reduced to at least 40:1 phosphorus to fluorine weight ratio and the seed particles are defluorinated phosphate rock particles.

3. Process of claim 1 wherein the phosphate rock feed is finer than about 100 mesh, the fluorine content thereof is reduced to at least 100:1 phosphorus to fluorine weight ratio and the seed particles are defluorinated phosphate rock particles.

4. Process of claim 2 which includes recycling at least a portion of the fine product particles when particle distribution of the defluorinated product is such that less than 25 percent of the product is −14 mesh.

5. Process of claim 2 including the step of recycling the fine product particles of −10 mesh to the fluid bed.

6. Process of claim 2 wherein the fine product particles of −14 mesh are recycled to the fluid bed when particle distribution of the defluorinated product is such that less than 25 percent of the product is −14 mesh.

7. Process of claim 4 wherein temperature in the fluid bed is from 2,450° to 2,700° F.

8. Process of claim 4 wherein temperatures in the fluid bed is from 2,250 to 2,450° F, said process including the step of adding defluorinating reagents to the fluid bed reactor in amount to facilitate defluorination of the phosphate rock feed at the indicated temperature.

9. Process of claim 1 wherein depth of the fluid bed is from 4 to 10 feet.

10. Process for defluorinating phosphate rock feed by thin-film technique comprising intitially introducing to a fluid bed reactor defluorinated phosphate rock seed particles of −¼ inch to +35 mesh (Tyler Standard); introducing fluidizing gases into the reactor to establish a fluidized bed of the seed particles; gradually introducing the phosphate rock feed finer than about 100 mesh at a point below the top of the fluidized bed until operating conditions are stabilized; continue introducing into a fluid bed reactor the phosphate rock feed and the fluidizing gas in order to establish a fluidized bed containing seed particles at least some of which are coated with a thin film of the phosphate rock feed; maintaining the fluidized bed at a sufficient temperature to reduce fluorine content of the phosphate rock feed to at least 40:1 phosphorus to fluorine weight ratio; and removing defluorinated phosphate rock feed from the fluid bed reactor.

11. Process of claim 10 in which the phosphorus to fluorine weight ratio is at least 100:1.

12. Process of claim 10 including the step of recycling to the fluid bed at least a portion of the fine product particles when particle distribution of the defluorinated feed is such that less than 25 percent of the product is −14 mesh.

13. Process of claim 10 including the step of recycling to the fluid bed the fine product particles of −10 mesh.

14. Process of claim 12 wherein temperature in the fluid bed is 2,450° to 2,700° F.

15. Process of claim 12 wherein temperature in the fluid bed is from 2,250° to 2,450° F, said process including the step of adding defluorinating reagents to the fluid bed reactor in amount to facilitate defluorination of the phosphate rock feed at the indicated temperature.

16. Process of claim 10 wherein depth of the fluid bed is greater than 2 feet.

17. Process of claim 10 wherein depth of the fluid bed is from 4 to 10 feet.

* * * * *